United States Patent [19]

Frushour

[11] Patent Number: 5,564,511
[45] Date of Patent: Oct. 15, 1996

[54] COMPOSITE POLYCRYSTALLINE COMPACT WITH IMPROVED FRACTURE AND DELAMINATION RESISTANCE

[76] Inventor: Robert H. Frushour, 2313 Devonshire, Ann Arbor, Mich. 48104

[21] Appl. No.: 415,693

[22] Filed: May 15, 1995

[51] Int. Cl.$^6$ .............................. E21B 10/00; B24B 1/00
[52] U.S. Cl. ........................... 175/431; 175/434; 51/293
[58] Field of Search ....................... 175/426, 428, 175/430, 431, 432, 434; 51/293, 295, 307, 309

[56] References Cited

U.S. PATENT DOCUMENTS

| | | |
|---|---|---|
| Re. 32,380 | 3/1987 | Wentorf, Jr. et al. . |
| 3,517,464 | 6/1970 | Mattia et al. ............... 51/293 X |
| 4,239,501 | 12/1980 | Wirth .......................... 51/295 X |
| 4,311,490 | 1/1982 | Bovenkerk et al. . |
| 4,496,372 | 1/1985 | Almond et al. . |
| 4,522,633 | 6/1985 | Dyer . |
| 4,592,433 | 6/1986 | Dennis . |
| 4,604,106 | 8/1986 | Hall et al. . |
| 4,626,407 | 12/1986 | Veltri et al. . |
| 4,629,373 | 12/1986 | Hall . |
| 4,662,896 | 5/1987 | Dennis . |
| 4,716,975 | 1/1988 | Dennis . |
| 4,784,023 | 11/1988 | Dennis . |
| 4,789,385 | 12/1988 | Dyer et al. . |
| 4,802,895 | 2/1989 | Burnard et al. . |
| 4,875,907 | 10/1989 | Phaal et al. . |
| 4,988,554 | 1/1991 | Peterson et al. ............ 51/295 X |
| 5,007,207 | 4/1991 | Phaal . |
| 5,011,509 | 4/1991 | Frushour . |
| 5,011,515 | 4/1991 | Frushour . |
| 5,014,468 | 5/1991 | Ravipati et al. ............ 51/295 |
| 5,032,147 | 7/1991 | Frushour . |
| 5,049,164 | 9/1991 | Horton et al. . |
| 5,120,327 | 6/1992 | Dennis . |
| 5,351,772 | 10/1994 | Smith . |
| 5,355,969 | 10/1994 | Hardy et al. . |
| 5,379,854 | 1/1995 | Dennis . |
| 5,449,388 | 9/1995 | Wiand ......................... 51/293 X |

Primary Examiner—Frank Tsay
Attorney, Agent, or Firm—Young and Basile, P.C.

[57] ABSTRACT

A polycrystalline compact cutting element for use in operations that require high impact and abrasion resistance. The compact includes a substrate formed of tungsten carbide or other hard material with a diamond or cubic boron nitride layer bonded to a mounting surface on the substrate. The interface between the layers is defined by a three-dimensional topography formed with a plurality of surface irregularities in an arrangement whereby a straight line or a constant radii accurate line does not connect a series of adjacent surface irregularities.

10 Claims, 2 Drawing Sheets

COMPOSITE POLYCRYSTALLINE COMPACT WITH IMPROVED FRACTURE AND DELAMINATION RESISTANCE

BACKGROUND OF THE INVENTION

1. Field of the Invention

The present invention relates to a wear and impact resistant polycrystalline diamond composite for use in rock drilling, machining of wear resistant substances, and other operations which require the high abrasion resistance or wear resistance of a diamond surface. Specifically, this invention relates to such bodies that comprise a polycrystalline diamond layer attached to a cemented metal carbide substrate by way of processing at ultrahigh pressures and temperatures or by chemical vapor deposition.

2. Description of the Art

Composite polycrystalline diamond compacts, PCD, have been used for industrial applications including rock drilling and metal machining for many years. One of the factors limiting the success of PCD is the strength of the bond between the polycrystalline diamond layer and the sintered metal carbide substrate. For example, analyses of the failure mode for drill bits used, for deep hole rock drilling show that in approximately 33 percent of the cases, bit failure or wear is caused by delamination of the diamond from the metal carbide substrate.

U.S. Pat. No. 3,745,623 (reissue U.S. Pat. No. 32,380) teaches the attachment of diamond to tungsten carbide support material. This, however, results in a cutting tool with a relatively low impact resistance. FIG. 1, which is a perspective drawing of this prior art composite, shows that there is a very abrupt transition between the metal carbide support and the polycrystalline diamond layer. Due to the differences in the thermal expansion of diamond in the PCD layer and the binder metal used to cement the metal carbide substrate, there exists, after fabrication at ultrahigh pressure and temperature, a stress in excess of 200,000 psi between these two layers. The force exerted by this stress must be overcome by the extremely thin layer of cobalt which is the binding medium that holds the PCD layer to the metal carbide substrate. Because of the very high stress between the two layers, which is distributed over a flat narrow transition zone, it is relatively easy for the compact to delaminate in this area upon impact. Additionally, it has been known that delaminations can also occur on heating or other disturbances aside from impact. In fact, parts have delaminated without any known provocation, most probably as a result of a defect within the interface or body of the PCD which initiates a crack and results in catastrophic failure.

U.S. Pat. No. 5,011,515 discusses numerous attempts by previous inventors, as shown in FIGS. 2 and 3 herein, to solve the problem of delamination of the polycrystalline diamond layer from the metal carbide substrate. U.S. Pat. No. 4,604,106 teaches the use of transitional layers in order to lessen the concentration of stress at the interface between the two layers, but the method described reduces overall bonding strength by introducing impurities and preventing the cobalt or other binder metal of the substrate from cleanly sweeping through the diamond layer, which is necessary for good sintering action. U.S. Pat. No. 4,784,023, as shown in FIG. 3 herein, and U.S. Pat. No. 4,592,433 teach parallel grooving of substrates to form ridges for increased bonding surface area. Similarly, U.S. Pat. No. 5,351,772 teaches the use of upwardly-projecting lands which extend radially.

These designs produce stress in some portions of the cutter which is actually higher than that exhibited in the planar interface of a PCD manufactured according to the teachings of U.S. Pat. No 3,745,623 (reissue U.S. Pat. No. 32,380). Finite element analysis (FEA) shows that three-dimensional surfaces do not eliminate this stress; however, they do redistribute the stress into localized areas, some of which are higher in stress and some of which are lower in stress. In order to take advantage of this redistribution, the geometry of the surface must be engineered so that if a crack is initiated it has difficulty in propagating across the interface or through the body of the cutter. Prior art shows a number of three-dimensional designs which all have essentially the same problem; namely, localized high concentration of stress which serves to initiate a fracture and a straight line or path for the initial fracture to follow.

Likewise, U.S. Pat. No. 5,379,854 shows the formation of ridges on non-planar substrates; i.e., substrates which utilize a hemispherical cap as the interface between the polycrystalline diamond and metallic carbide support. In this instance as in the others, regions of alternating stress are present, and the higher stress areas result in formation of a crack or other type of flaw at the interface between the diamond and carbide support which then is propagated easily along the lines of the ridge or along the smoothly curving surface of the hemispherical interface.

U.S. Pat. No. 5,355,969 teaches the use of three dimensional protuberances spaced apart in a radial direction from the axis of a planar support surface. This offers some advantage over that of a clearly defined ridge since once initiated a crack does not have a single planar side wall or ridge along which to propagate. However, as a result of the specific radial distribution of these protuberances, a crack can propagate easily either radially along a spoke or in a circumferential direction between the protuberances.

U.S. Pat. No. 5,011,515 teaches the use of surface irregularities spread in near uniformity across the substrate mounting surface in a patterned or in a random manner to control the percentage of diamond in the zone that exists between the metal carbide support and the polycrystalline diamond layer. This serves to spread uniformly the alternating bands of stress and, in the case of random distribution of protuberances, does not provide an easy path for a fracture to propagate. Conversely, in the case of a patterned distribution of surface irregularities, a crack can propagate easily in any number of directions, along a straight line between the protuberances.

It would be desirable to have a three dimensional substrate mounting surface with a topography which would distribute uniformly the unavoidable stress in a predetermined pattern without a simple or obvious pathway for a crack, once initiated, to propagate anywhere within the interface between the polycrystalline diamond and metal carbide substrate.

SUMMARY OF THE INVENTION

The instant invention provides the topography of the surface of a sintered metal carbide substrate with irregularities patterned such that when the substrate is mated to a polycrystalline material, the identically shaped mating surfaces form intimate contact with each other, the first touching the second surface at all or nearly all points. The key feature of this type of surface topography is that a straight line or a line with simple radius of curvature cannot be established for a consequential distance anywhere on the surface. The surface is made up of compound curves along lines which continually change direction from one protuberance to the next and, therefore, a fracture once initiated cannot readily propagate in any direction.

BRIEF DESCRIPTION OF THE DRAWINGS

This invention will be better understood from the following description and drawings in which.

DESCRIPTION OF THE PREFERRED EMBODIMENTS

In the following disclosure and claims, it should be understood that the term polycrystalline diamond, PCD, or sintered diamond, as the material is often referred to in the art, can also be any of the superhard abrasive materials, including, but not limited to, synthetic or natural diamond, cubic boron nitride, and wurzite boron nitride as well as combinations thereof.

Also, the cemented metal carbide substrate refers to a carbide of one of the group IVB, VB, or VIB metals which is pressed and sintered in the presence of a binder of cobalt, nickel, or iron and the alloys thereof.

Figure 1:
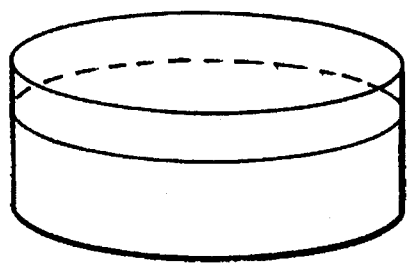
FIG. 1 is a perspective view of a prior art PCD composite compact.

FIG. 1 shows a prior art PCT compact in which the polycrystalline diamond layer is joined to a metallic carbide support by a singular, two-dimensional flat plane. In this design once a crack has initiated, it easily propagates throughout the entire plane causing partial or complete delamination between the diamond cutting surface and the metallic carbide support surface.

Figure 2:
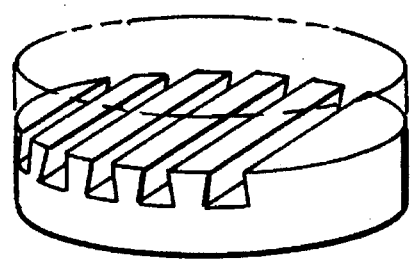
FIG. 2 is a perspective view of a prior art PCD composite compact having undercut grooves.

FIG. 2 shows a PCD compact formed using a support surface with undercut grooves intended to provide a good mechanical grip upon the diamond layer by the metallic carbide support layer, however, the large difference in thermal expansion causes the fractures to occur at the base or atop the ridge thus separating either the diamond layer at the top or the metallic carbide layer at the bottom of the groove.

Figure 3:
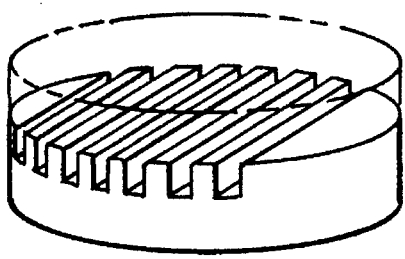
FIG. 3 is a perspective view of a prior art PCD composite compact having parallel grooves.

FIG. 3 shows an improvement over the PCD compact described in FIG. 2; however, similar fracture patterns still occur at the top or at the bottom of these grooves, and these fractures are propagated easily along the length of the channeled grooves.

Figure 4:
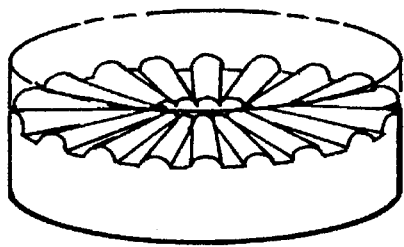
FIG. 4 is a perspective view of a prior art PCD composite compact having radial grooves.

FIG. 4 shows a typical PCD compact formed using radially spaced grooves or ridges and again cracks which form at the top or at the bottom of these grooves propagate readily along the length of the channel thereby substantially weakening the overall composite cutting tool.

Figure 5:
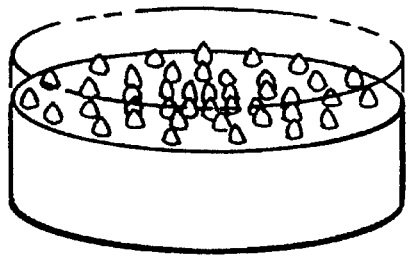
FIG. 5 is a perspective view of a prior art PCD composite compact having radial protuberances.

FIG. 5 depicts another prior art PCD compact which differs from FIG. 4 in that the radial ridges are broken into three dimensional hillocks (or protuberances, irregularities, bumps, etc). This pattern helps to isolate areas of high stress concentration; however, cracks still may propagate in many directions. A crack may grow in length radially between the hillocks or form in a circumferential direction to the axis of the cutter in a plane parallel to the interface between the polycrystalline diamond layer and the metallic carbide support layer.

Figure 6:
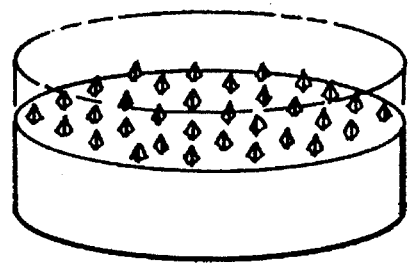
FIG. 6 is a perspective view of a prior art PCD composite compact having patterned protuberances.

FIG. 6 shows a regular pattern of mounds or irregularities in a prior art PCD compact, and once again a crack may propagate in numerous directions where straight lines lie along the interface of the two layers between the surface irregularities.

Figure 7:
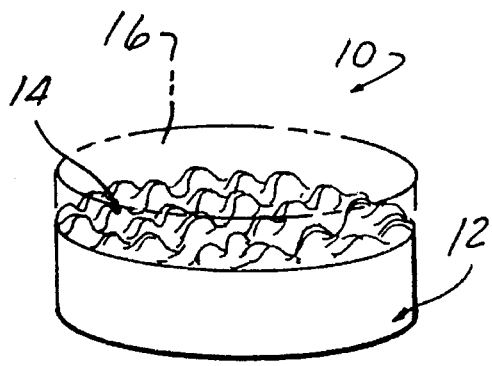
FIG. 7 is a perspective view of a PCD compact of the present invention.
Figure 8:
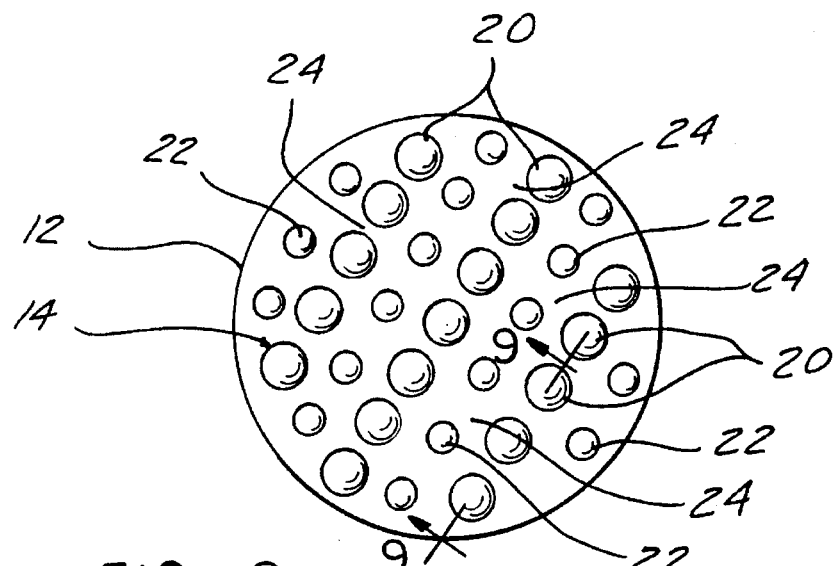
FIG. 8 is a plan view of the surface topography of the substrate shown in FIG. 7.

FIGS. 6, 7 and 8 depict the present invention. In FIG. 7, a cutting element 10 is formed of a substrate 12 formed of a suitable material, such as a sintered metal carbide, tungsten carbide or other hard material. The top or mounting surface 14 of the substrate 12 has a surface topography formed of surface irregularities, such as spaced, alternating protuberances and depressions as described in greater detail hereafter. A polycrystalline diamond layer 16 is bonded to the top mounting surface 14 of the substrate 12. The polycrystalline diamond layer is comprised mostly of diamond. However, the use of cubic boron nitride and mixtures of diamond and cubic boron nitride can be substituted for the diamond layer in the present cutting element 10.

The polycrystalline diamond layer 16 has a mounting surface formed identical to the surface topography of the end surface 14 on the substrate 12 such that when the polycrystalline diamond layer 16 is bonded to the substrate 12, substantially all points on the mounting surfaces of the polycrystalline diamond layer 16 and the substrate 12 are in contact with each other.

Figure 9:
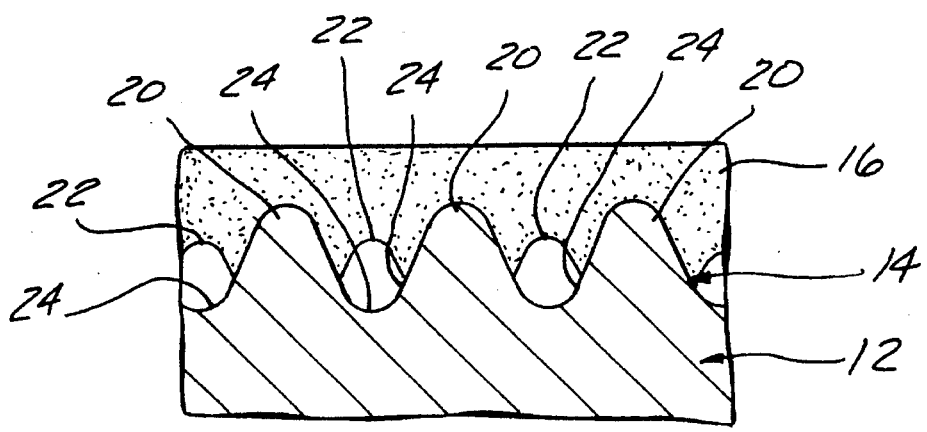
FIG. 9 is a cross-sectional view generally taken along line 8—8 in FIG. 8.

The following description of the surface topography of the cutting element 10 will be described for the mounting surface 14 on the substrate 12. It will be understood that the mounting surface on the polycrystalline diamond layer 16 has an identical, complementary surface topography. As shown in FIGS. 8 and 9, the surface topography of the mounting surface 14 on the substrate 12 includes a plurality of protuberances, such as major or higher protuberances 20 and shorter protuberances 22. The protuberances 20 and 22 are interspersed in a particular pattern across the mounting surface 14 such that each major protuberance 20 is interposed between four adjacent minor protuberances 22. Likewise, each minor protuberance 22 is interposed between four adjacent major protuberances 20. As shown in FIG. 9, each major and minor protuberance 20 and 22 is connected to adjacent protuberances 20 or 22 by means of depressions 24.

The protuberances 20 and 22 may have any suitable form, such as a smoothly curved, generally conical or pyramidal form formed by diverging side walls. Further, the top or outermost end portions of each of the protuberances 20 and 22 preferably has a smoothly curved or arcuate, generally concave shape as shown in FIG. 9. Similarly, the depressions 24 also preferably have a smoothly curved shape, generally in the form of a convex curve. This surface topography is similar to that found in foam packing materials or acoustical foam.

The major protuberances 20 are joined by depressions 24 to adjacent minor protuberances 22 in a manner such that a straight line or simple curved line does not follow along the surface 14 at the interface between the polycrystalline diamond layer 16 and the substrate 12. Thus, if a fracture is initiated for any reason it cannot grow or propagate easily along a surface or line of constant stress. The alternating stress fields and surface irregularities serve to block the advancing fracture and limit its growth to that of the maximum surface dimension of single protuberance (or hillock, mound, irregularity, etc.).

What is claimed is:

1. A cutting element comprising:

a substrate having a first surface;

the first surface being formed with a plurality of surface irregularities formed of adjacent protuberances and depressions arranged in a non-linear, non-arcuate, constantly changing pattern across the first surface; and a polycrystalline material layer having a cutting surface and an opposed mounting surface joined to the first surface of the substrate, the mounting surface having a surface topography complementary to the first surface.

2. The cutting element of claim 1 wherein:

the protuberances and the depressions forming the surface irregularities have smoothly curved ends.

3. The cutting element of claim 1 wherein:

the protuberances and the depressions of the surface irregularities form compound curves between adjacent protuberances.

4. The cutting element of claim 1 wherein:

the height of adjacent protuberances and the depth of adjacent depressions varies across the first surface.

5. The cutting element of claim 1 wherein:

the first surface of the substrate and the mounting surface of the polycrystalline material layer are identically shaped.

6. The cutting element of claim 1 wherein:

the protuberances and depressions form an ever changing surface contour across the first surface to inhibit stress fracture propagation along straight lines and constant radius arcs.

7. In a cutting element formed of a substrate having a first surface and a polycrystalline material layer having a cutting surface and an opposed mounting surface joined to the first surface of the substrate, the improvement comprising:

the first surface and the mounting surface having complementary mating surface topographies having a plurality of surface irregularities formed of adjacent protuberances and depressions arranged in a non-linear, non-arcuate, constantly changing pattern across the first surface and the mounting surface.

8. The improvement of claim 7 wherein:

the protuberances and the depressions have smoothly curved ends.

9. The improvement of claim 7 wherein:

the protuberances and the depressions form compound curves between adjacent protuberances and depressions.

10. The improvement of claim 7 wherein:

the height of adjacent protuberances and the depth of adjacent depressions varies across the first surface and the mounting surface.

* * * * *